3,150,166
STABILIZED POLYMERIZABLE ETHYLENICALLY UNSATURATED MONOMERS
Heinz Pohlemann, Ludwigshafen (Rhine), Heinz Burger, Heidelberg, and Otto Leichtle, Ludwigshafen (Rhine), Germany, assignors to Badische Anilin- & Soda-Fabrik Aktiengesellschaft, Ludwigshafen (Rhine), Germany
No Drawing. Filed Nov. 8, 1960, Ser. No. 67,901
Claims priority, application Germany Nov. 12, 1959
5 Claims. (Cl. 260—486)

This invention relates to stabilized, polymerizable, ethylenically unsaturated monomers.

Many ethylenically unsaturated monomers tend to polymerize when stored, or during purification by distillation, for example at an elevated temperature, in daylight, or in contact with air. Impurities may also impair the stability of these compounds.

Polymerizable ethylenically unsaturated monomers have hitherto been treated for example with aqueous sodium nitrite solution or with oxides of nitrogen to stabilize them against undesirable polymerization. The addition of various organic substances, such as hydroquinone, cresol derivatives, pyrogallol, para-tertiary-butyl pyrocatechol, amines, methylene blue or insoluble ion exchange resins which contain nitrite ions may also suppress undesirable polymerization.

Additives of the said type must however usually be removed prior to polymerization because they lead to discoloration of the polymers or influence their degree of polymerization, thus occasioning waste of monomers and expenditure of time and energy. It is true that some stabilizers are known, as for example 2,5-di-tertiary-butylhydroquinone, which cause no disturbance either in the polymerization or in the polymers, but their inhibiting action is only small.

The object of this invention is to provide ethylenically unsaturated monomers which have been effectively stabilized against undesirable polymerization by means of compounds that do not have to be removed when polymers are to be produced from the said monomers. Further objects of the invention will become apparent to those skilled in the art from the following detailed description of our invention.

We have found that polymerizable ethylenically unsaturated monomers containing as stabilizer about 0.0001 to 2, preferably 0.001 to 0.05% by weight of a substituted oxadiazole having the general formula:

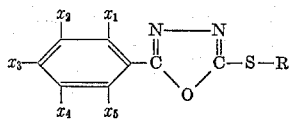

wherein each of $x_1$ to $x_5$ represents a hydrogen atom, a linear, branched or cycloaliphatic radical containing 1 to 8 carbon atoms, a hydroxyl group or an alkoxy group containing 1 to 4 carbon atoms, and R is a hydrogen atom, a linear or branched aliphatic radical having 1 to 12 carbon atoms, a cycloaliphatic radical having 5 to 8 carbon atoms, the benzyl radical, a hydroxy benzyl radical, dihydroxybenzyl group, a nitro benzyl group or a radical of the general formula:

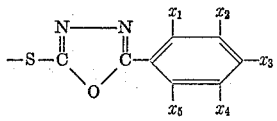

wherein $x_1$ to $x_5$ have the meanings given above, exhibit good stability against undesirable polymerization. Linear, branched and cycloaliphatic radicals that contain 1 to 8 carbon atoms and may be used as substituents $x_1$ to $x_5$ include the methyl, ethyl, propyl, isopropyl, butyl, isobutyl, tertiary butyl, pentyl, cyclopentyl, octyl, cyclohexyl, 2-ethylhexyl and cyclooctyl radicals. Alkoxy groups that contain 1 to 4 carbon atoms and may be used as substituents $x_1$ to $x_5$ include the methoxy, ethoxy, propoxy, isopropoxy and the tert.- butoxy groups.

Useful linear and branched aliphatic radicals R containing 1 to 12 carbon atoms include, besides the aliphatic radicals mentioned above, the decyl, isodecyl and dodecyl radicals. Suitable cycloaliphatic radicals R include the cyclopentyl, cyclohexyl, cycloheptyl, cyclooctyl, methylcyclopentyl and methylcyclohexyl radicals.

Oxadiazoles of the said kind in which one or more of $x_1$ to $x_5$ represents hydroxyl groups are especially active, and in particular those in which R represents a hydrogen atom, i.e., 2-mercapto-5-phenyl-1,3,4-oxadiazoles which bear as substituents at the benzene nucleus 1 to 3 hydroxyl groups, are especially active as stabilizers.

Substituted oxadiazoles which are suitable as stabilizers according to this invention include 2-mercapto-5-(4'-hydroxyphenyl)-1,3,4-oxadiazole,
2-methylmercapto-5-(4'-hydroxyphenyl)-1,3,4-oxadiazole,
2-mercapto-5-(3'-hydroxyphenyl)-1,3,4-oxadiazole,
2-mercapto-5-(2'-hydroxyphenyl)-1,3,4-oxadiazole,
2-mercapto-5-(3',4',5'-trihydroxyphenyl)-1,3,4-oxadiazole,
2-methylmercapto-5-(3',4',5'-trihydroxyphenyl)-1,3,4-oxadiazole,
2-mercapto-5-(4'-hydroxy-3'-methoxyphenyl)-1,3,4-oxadiazole,
2-mercapto-5-(3',4'-methylenedihydroxyphenyl)-1,3,4-oxadiazole,
2-mercapto-5-(3',5'-di-tertiary-butyl-4'-hydroxyphenyl)-1,3,4-oxadiazole,
5-(4'-hydroxyphenyl)-1,3,4-oxadiazolyl-(2)-disulfide,
5-(3',4',5'-trihydroxyphenyl)-1,3,4-oxadiazolyl-(2)-disulfide,
5-(3,5'-di-tertiary-butyl-4'-hydroxyphenyl)-1,3,4-oxadiazolyl-(2)-disulfide,
2-benzylmercapto-5-(4'-hydroxyphenyl)-1,3,4-oxadiazole,
2-para-hydroxybenzylmercapto-5-(4-hydroxyphenyl)-1,3,4-oxadiazole,
2-(3,4-dihydroxybenzyl)-mercapto-5-(4'-hydroxyphenyl)-1,3,4-oxadiazole,
2-dodecylmercapto-5-(4'-hydroxyphenyl)-1,3,4-oxadiazole,
2-ethylhexylmercapto-5-(4'-hydroxyphenyl)-1,3,4-oxadiazole,
2-cyclohexylmercapto-5-(4'-hydroxyphenyl)-1,3,4-oxadiazole,
2-dinitrophenylmercapto-5-(4'-hydroxyphenyl)-1,3,4-oxadiazole, and similar oxadiazoles substituted in the benzene nucleus attached at the 5-posiiton of the oxadiazole nucleus, such as 2-benzylmercapto-5-(trihydroxyphenyl)-1,3,4-oxadiazole.

The stabilized monomers according to our invention may contain one or more oxadiazoles of the kind specified above. They may also be diluted with solvents, for example hydrocarbons such as cyclohexane, octane, benzene or toluene. The stabilized monomers, i.e., the mixtures of polymerizable ethylenically unsaturated monomers and substituted oxadiazoles, are obtained by adding to the monomers substituted oxadiazoles of the kind specified above.

By polymerizable ethylenically unsaturated monomers we understand vinyl halides such as vinyl chloride, vinylidene chloride and 2-chlorobutadiene-(1,3), vinylaromatic monomers such as styrene, α-methyl styrene and vinyl toluenes, heterocyclic monomers containing vinyl groups such as vinyl pyridines, vinyl imidazoles, vinyl pyrrolidone and vinylcarbazole, acrylic and methacrylic monomers such as acrylic and methacrylic acid, acrylonitrile, acrylamide and methacrylamide, acrylic and methacrylic esters of linear, branched and cycloaliphatic alcohols containing 1 to 20 carbon atoms such as methanol, ethanol, propanol, isopropanol, butanol, isobutanol, cyclohexanol, 2-ethylhexanol, decyl, dodecyl and tridecyl alcohol, vinyl esters of carboxylic acids containing 2 to 20 carbon atoms such as vinyl acetate, vinyl propionate, vinyl butyrate and vinyl stearate, vinyl ethers such as divinyl ether and tertiary butyl vinyl ether, vinyl ketones such as methyl vinyl ketone and tertiary butyl vinyl ketone, and further vinyl sulfonic and vinyl phosphonic acids and their salts. Each of these monomers has a single ethylenically unsaturated group of the formula $CH_2=CH<$.

A special advantage of the stabilizers according to this invention is their property of neither inhibiting an intended polymerization of ethylenically unsaturated monomers after the addition of the conventional polymerization catalysts, nor influencing the degree of polymerization of the monomers, nor of causing discoloration or other lessening of quality in the polymers. It is therefore not necessary to separate these stabilizers prior to polymerization.

The following examples will further illustrate this invention but the invention is not restricted to these examples. The percentages given in the examples are percentages by weight with reference to the amount of ethylenically unsaturated monomers.

EXAMPLE 1

Samples of ethyl acrylate, which contain the percentages of oxadiazoles set out in the following table and which have been fused into glass tubes, are heated at 90° C.

The time in minutes which elapses before polymerization begins spontaneously, i.e., not initiated by the addition of a catalyst, is given in the following table as a measure of the stabilizing action of the various oxadiazoles. The oxadiazoles added are:

(A) 2-mercapto-5-(4'-hydroxyphenyl)-1,3,4-oxadiazole
(B) 2-mercapto-5-(3',4',5'-trihydroxyphenyl)-1,3,4-oxadiazole
(C) 2-mercapto-5-(3'-hydroxyphenyl)-1,3,4-oxadiazole
(D) 2-mercapto-5-(3',5'-di-tertiary-butyl-4'-hydroxyphenyl)-1,3,4-oxadiazole

*Stabilizing Action of Various Oxadiazoles*

| Oxadiazole added | Amount of oxadiazole added in $10^{-4}$% | | | | | | | |
|---|---|---|---|---|---|---|---|---|
| | 1.25 | 2.5 | 5 | 10 | 20 | 40 | 80 | 160 |
| A | 75 | 120 | 360 | 760 | 1,200 | 1,980 | 2,220 | 2,220 |
| B | 220 | 450 | 1,000 | 2,650 | 7,300 | 20,000 | 56,000 | 10,000 |
| C | 285 | 570 | 1,200 | 2,400 | 5,200 | 11,000 | 23,000 | 48,000 |
| D | 110 | 160 | 360 | 1,800 | 2,280 | 2,820 | 3,300 | 3,900 |

In ethyl acrylate samples to which, for purposes of comparison, no oxadiazole is added, polymerization sets in under otherwise identical conditions after about 45 to 90 minutes.

EXAMPLE 2

Acrylic acid, to which $1.5 \times 10^{-3}$% of 2-mercapto-5(4'-hydroxyphenyl)-1,3,4-oxadiazole has been added, is heated at 90° C. It does not begin to polymerize until after 10 hours.

Unstabilized acrylic acid begins to polymerize at 90° C. after only 55 minutes.

EXAMPLE 3

In order to show that the stabilizers according to this invention do not impair the initiation period and speed of the catalyst-initiated polymerization of ethyl acrylate or affect the molecular weight of the polymer, ethyl acrylate which contains 2-mercapto-5-(4'-hydroxyphenyl)-1,3,4-oxadiazole as stabilizer is polymerized in aqueous emulsion with the addition of 0.3% of potassium persulfate as catalyst. For purposes of comparison, ethyl acrylate which contains no 2-mercapto-5-(4'-hydroxyphenyl)-1,3,4-oxadiazole is polymerized under the same conditions. The values obtained are collected in the following table:

| Amount of stabilizer in $10^{-4}$% | k-value | Speed of polymerization in grams of monomer per liter of emulsion per hour | Initiation period in minutes |
|---|---|---|---|
| -------- | 126 | 736 | 62 |
| 30 | 126 | 767 | 56 |
| 100 | 129 | 708 | 79 |

EXAMPLE 4

Samples of ethyl acrylate which contain amounts of oxadiazoles as set out in the following table and which have been fused into glass tubes are heated at 90° C. The time in hours which elapses before spontaneous polymerization begins is given as the measure of the stabilizing action:

| Oxadiazole used | Amount of oxadiazole added in $10^{-4}$% | | | | | |
|---|---|---|---|---|---|---|
| | None | 25 | 50 | 100 | 200 | 400 |
| HO—⟨OCH₃-phenyl⟩—C(=N—N)—C—SH (with O bridge) | 0.75 | 8 | 20 | 36 | 72 | 336 |
| H₂C(O—O—phenyl)—C(=N—N)—C—SH (with O bridge) | 0.75 | 4 | 8 | 16 | 31 | 64 |

EXAMPLE 5

$1.0 \times 10^{-3}\%$ of the compound:

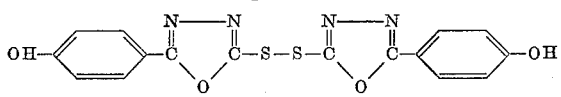

is added to practically pure acrylic acid and a sample heated to 90° C. Spontaneous polymerization occurs in the unstabilized acrylic acid after heating for 1 hour at 90° C. and in the stabilized acrylic acid after about 7 hours.

We claim:

1. A stabilized, mono-ethylenically unsaturated monomer selected from the group consisting of acrylic acid, methacrylic acid, esters of said acids with saturated alcohols of the formula ROH wherein R is a member selected from the group consisting of alkyl of 1–20 carbons and cyclohexyl, and vinyl esters of saturated aliphatic acids of the formula R'COOH wherein R' is an alkyl group of 2–20 carbons, said monomer containing as a stabilizer against polymerization through said mono-ethylenic group 0.0001–2% by weight of a substituted oxadiazole of the formula

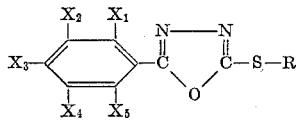

wherein each of $X_1$ through $X_5$ independently represents a member selected from the group consisting of hydrogen, alkyl of 1–8 carbons, cycloalkyl of 5–8 carbons, hydroxy, and alkoxy of 1–4 carbons, $X_1$ through $X_5$ are hydrogen in 2–4 occurrences, and R represents a member selected from the group consisting of hydrogen, alkyl of 1–12 carbons, cycloalkyl of 5–8 carbons, benzyl, hydroxybenzyl, dihydroxybenzyl, dinitrophenyl, and a group of the formula

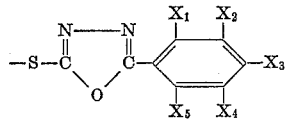

wherein $X_1$ through $X_5$ have the definition set forth above.

2. A stabilized monomer as claimed in claim 1 wherein said stabilizer is present in an amount in the range of 0.001 to 0.05% by weight.

3. A stabilized monomer as claimed in claim 1 wherein said stabilizer is present in an amount in the range of 0.001 to 0.05% by weight and said stabilizer is 2-mercapto-5-hydroxyphenyl-1,3,4-oxadiazole.

4. A stabilized monomer as claimed in claim 1 wherein said stabilizer is present in an amount in the range of 0.001 to 0.05% by weight and said stabilizer is 2-mercapto-5-dihydroxyphenyl-1,3,4-oxadiazole.

5. A stabilized monomer as claimed in claim 1 wherein said stabilizer is present in an amount in the range of 0.001 to 0.05% by weight and said stabilizer is 2-mercapto-5-trihydroxyphenyl-1,3,4-oxadiazole.

References Cited in the file of this patent

UNITED STATES PATENTS 2,843,491     Allen et al.   _____ July 15, 1958